Nov. 22, 1966    F. G. BACK    3,287,497
TRACKING DEVICE
Filed May 14, 1963    4 Sheets-Sheet 1

INVENTOR.
FRANK G. BACK
BY Albert F. Kronman
ATTORNEY

Nov. 22, 1966

F. G. BACK 3,287,497

TRACKING DEVICE

Filed May 14, 1963

INVENTOR.
FRANK G. BACK

BY *Albert F. Kronman*

ATTORNEY

Nov. 22, 1966   F. G. BACK   3,287,497
TRACKING DEVICE
Filed May 14, 1963   4 Sheets-Sheet 4

INVENTOR.
FRANK G. BACK
BY Albert F. Kronman
ATTORNEY

United States Patent Office 3,287,497
Patented Nov. 22, 1966

3,287,497
TRACKING DEVICE
Frank G. Back, Lattingtown, N.Y.
(55 Sea Cliff Ave., Glen Cove, N.Y.)
Filed May 14, 1963, Ser. No. 280,358
7 Claims. (Cl. 178—7.88)

This invention relates to tracking devices and particularly to those in which two or more lenses may be employed with means for changing from one focal length to another, and is a continuation-in-part of an application entitled, Tracking Device, filed September 11, 1961, in the name of Frank G. Back, Serial No. 137,279 now abandoned. The invention has particular reference to a safety device which prevents light from passing through the optical system when the device is not being used. This feature is important when the device is being used in combination with a photosensitive transducer or television camera.

When it is desired to track certain objects through the sky such as aircraft, rockets, missiles, and the like, it is often desirable to shift from short focal length lenses to long focal length lenses to take advantage of the features provided by each type. Since the lenses employed must of necessity produce large magnifications, it is essential to maintain the lenses in as rigid a mounting as possible. Also, since many adaptions of such optical systems are used in conjunction with photosensitive transducers, such as television camera tubes, it is desirable to limit the amount of light admitted by the optical system so that the photosensitive materials will not be damaged.

Accordingly, it is an object of the present invention to provide a tracking device capable of using two or more lenses, which includes a normally light blocking device and which can be operated to shift from one to another lens system and produce desired images under the control of an operator.

Another object of the present invention is to provide a tracking device in which the focussed beam can be shifted to any one of two or more lens systems without moving the lenses themselves.

Another object of the invention is to provide a tracking device having an optical system in which a reticle image is superimposed on the image of the object in the focal plane.

Another object of the invention is to provide a compact easily handled tracking device employing lenses of different focal length.

A feature of the present invention is its use of a long focal length lens together with a short focal length lens and a rotatable mirror which shifts from a neutral light blocking position to either lens system.

A further feature of the present invention is its use of a reticle projection device for superimposing a reticle image on the object image.

Still another feature of the invention is its use of motors and solenoids which may be remotely controlled for focussing and shifting the various optical components during the operation of the tracking device.

The invention consists of the construction, combination and arrangement of parts, as herein illustrated, described, and claimed.

In the accompanying drawings, forming a part hereof is illustrated one form of embodiment of the invention, in which drawings similar reference characters designate corresponding parts, and in which.

Figure 1:
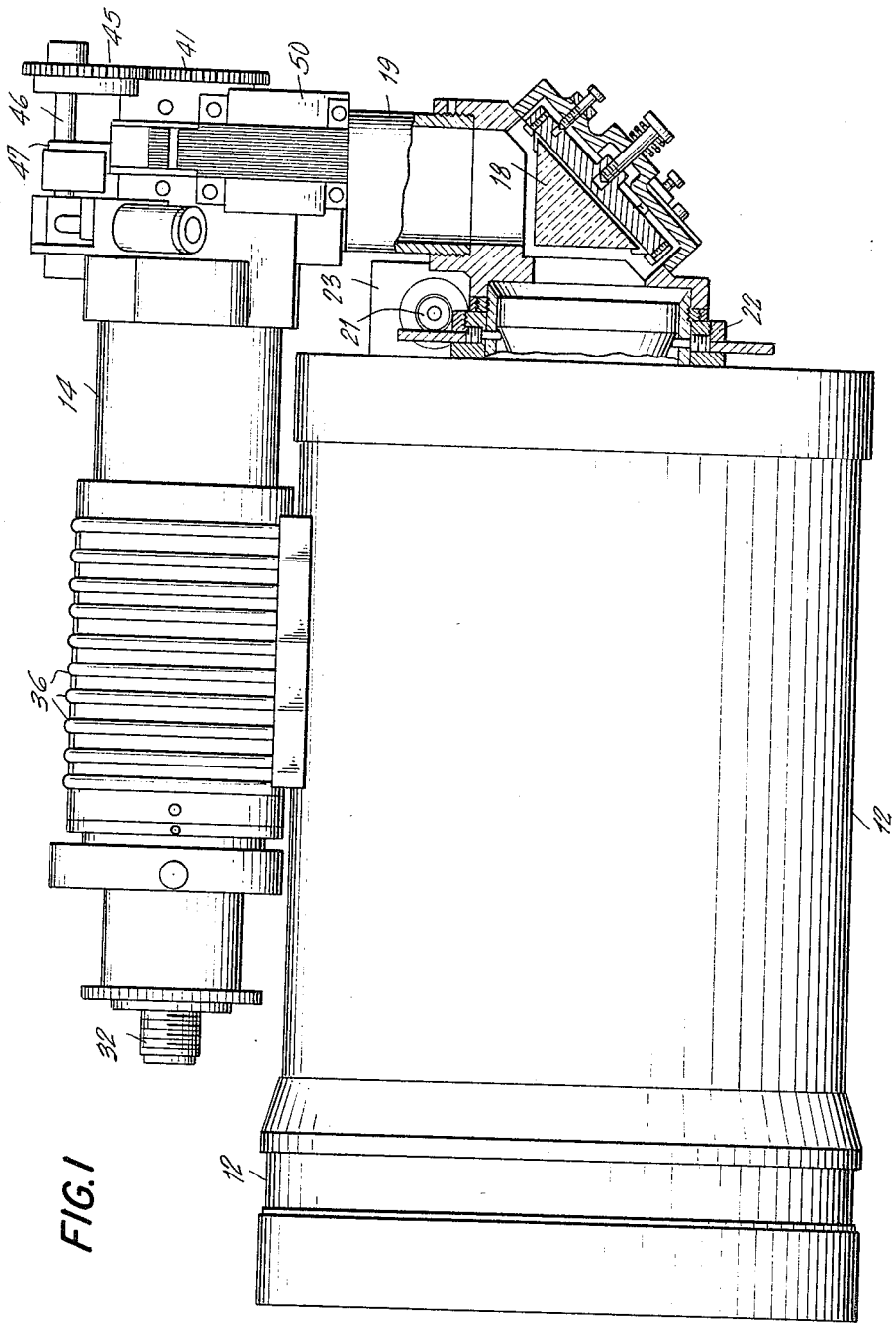
FIGURE 1 is a side view of a complete embodiment of a tracking device made in accordance with the present invention with some parts shown in section.

Referring now to the drawings, the tracking device comprises a housing 10 (shown only in FIGURES 2 and 3) having a flat base portion 11 for securing the device to a support. The front wall 10A of the housing is provided with openings to receive four cylindrical tubes for the admission of light. The rear wall 10B is formed with an opening for the transmission of a focussed beam which enters a camera, a television vidicon tube, or some similar device (not shown). A long focus lens system is housed in a barrel 12 for delivering an enlarged image to the focal plane. A short focus lens system is housed in a smaller barrel 13 for delivery a wide angle image to the focal plane for rapid tracking purposes. A third tube 14 is secured to front wall 10A for providing an image of a reticle in the focal plane. Light supplied by a lamp 15 secured within a lamp housing 30 serves to project the reticle into the camera.

Figure 2:
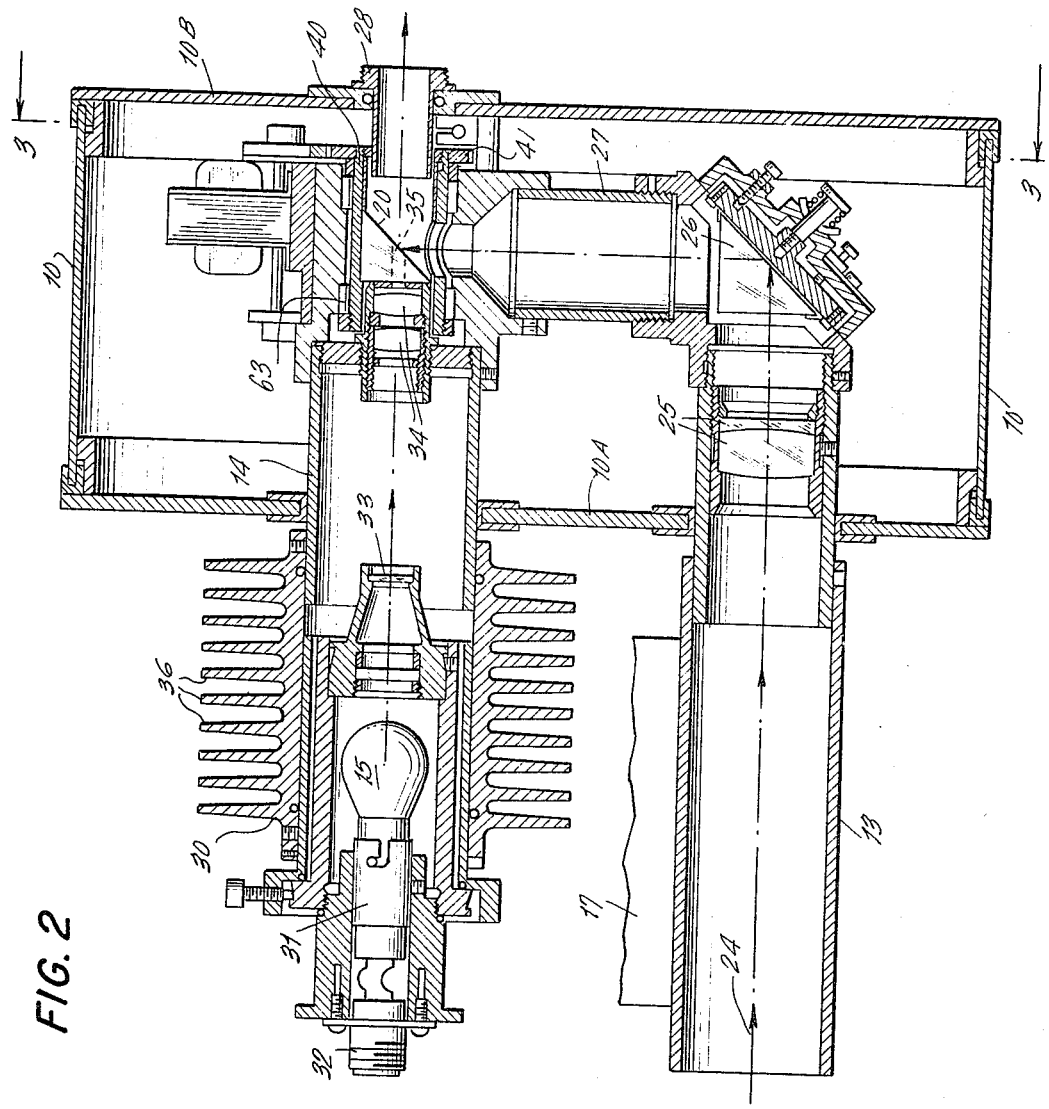
FIGURE 2 is a cross sectional view of a portion of the tracking device showing the reticle optical system, the short focal length optical system, and two of the mirrors used in the system.

The long focus lens system in barrel 12 may be of any well known type. The light traversing this lens is directed to a prism 18 (FIG. 1) which reflects the beam and sends it toward an inclined second prism or mirror having a rotatable reflecting surface 20 (FIG. 2). The long focus lens system is axially adjustable by means of worm screws 21 and worm gear 22. The lens adjustment is controlled by a reversible motor 23.

The short focus lens system in barrel 13 also may be of any well-known type of lens system. Light indicated by the arrows 24 is received from the object, focussed by lens elements 25, and reflected by reflecting prism 26. After leaving prism 26, the light travels through tube 27 to the rotatable mirror 20, and finally is focussed on an image plane. Lamp housing 30 contains a source of illumination which may be an electric lamp 15, secured by a bayonet base 31, and connected to an external plug connector 32 for connection to a source of electric power. The lamp 15 illuminates a reticle 33 and the image of the reticle is focussed by a lens combination 34 through a bore 35 in reflector 20 onto the focal plane of the camera. Housing 30 may be cooled by a plurality of cooling fins 36.

Figure 3:
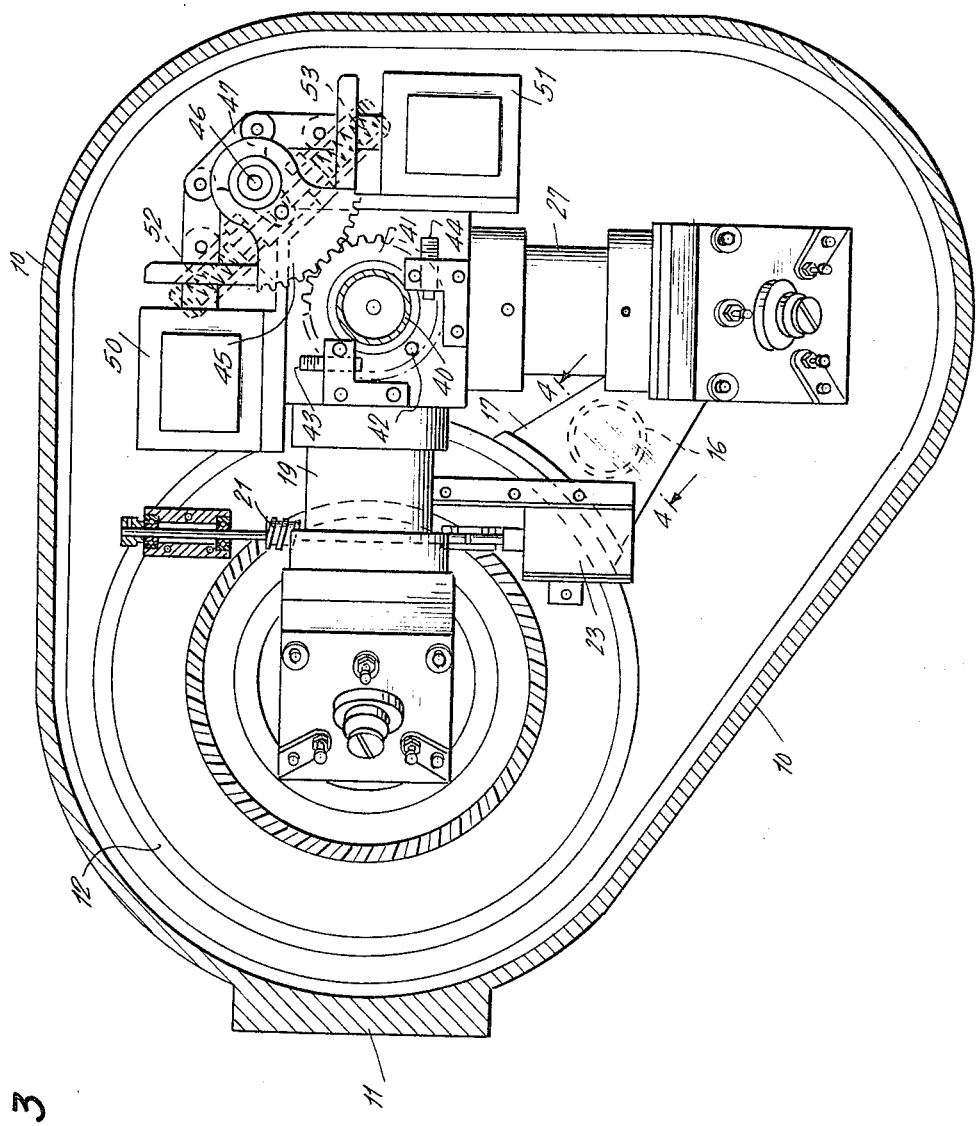
FIGURE 3 is a partial cross sectional view of the device shown in FIGURE 2 and is taken along line 3—3 of that figure. This view shows the two solenoids which can be operated to shift a mirror and change the lenses in the optical system.
Figure 4:
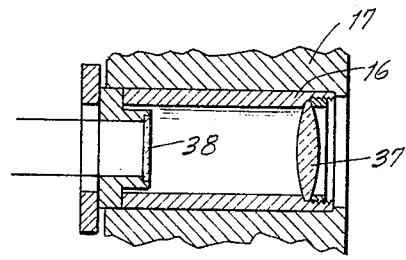
FIGURE 4 is a cross sectional view of a photosensitive cell and optical system for protecting a camera focal plane sensing surface from an excessive amount of light. This view is taken along line 4—4 of FIGURE 3.

A support tube 16 is shown supported in bracket 17 in FIGS. 3 and 4. This tube supports a lens system 37 which directs light from the object to a photosensitive transducer 38. This transducer may be a photoconductive cell such as lead sulphide or lead selenide. However, any type of photosensitive transducer may be employed. This cell and its associated circuitry are for protective purposes only and do not have any functional connection with the formation and transfer of the image to the focal plane. The operation of this portion of the invention will be described later.

Focussed beams from both the long and short optical systems are directed to the rotatable reflector 20. This reflecting surface may be formed on a prism which is secured to rotatable barrel 40 mounted in needle bearings 63 and secured to gear 41 (see FIG. 3). A limit pin 42 is secured to gear 41, this pin limiting against adjustable screws 43 and 44 to insure that the reflecting surface 20 stops at the correct position for reflecting the beams from reflecting prisms 18 or 26 (see FIGURE 3).

Gear 41 meshes with a gear sector 45 which is secured to a shaft 46 and a double bell crank 47. The two ends of this crank are coupled to two solenoids 50 and 51, each of which is adapted to turn the barrel 40 and its reflecting surface 20 from a neutral, non-reflecting position to a position which either reflects light from the long focus lens system through barrel 19 to the focal plane, or reflects light from the short focus lens system through barrel 27 to the same plane. The gear arrangement, barrel 40, and reflecting surface 20 are all yieldably held in a neutral or non-transmitting position by a pair of springs 52 and 53 until moved to a reflecting position by the operation of either one of the solenoids 50, 51.

Figure 5:
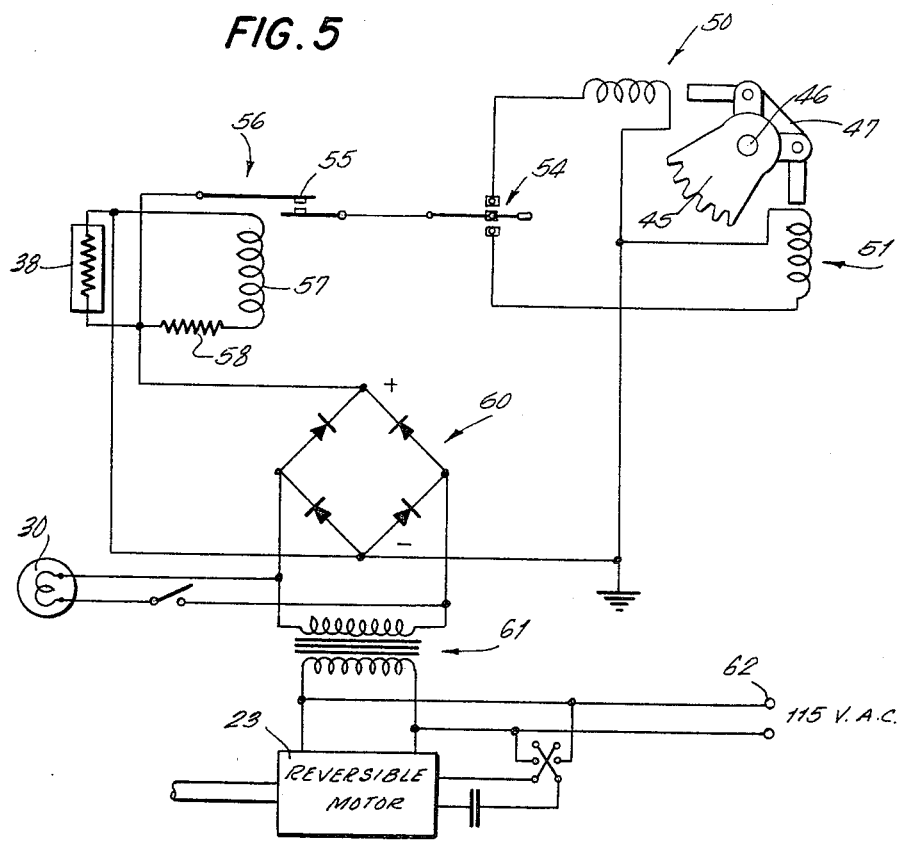
FIGURE 5 is a schematic wiring diagram of the entire control circuit.

The operating circuit for twitching lenses and for protecting the photosensitive surface in the focal plane is shown in FIGURE 5. In this circuit diagram the solenoid windings are connected respectively to a common ground and to the terminals of a single-pole, double-throw switch 54. The moving element of this switch is connected to the normally open contacts 55 of relay 56 having a winding 57. Winding 57 is connected to a source of direct current in series with a resistor 58. The source of potential in this circuit is a four-armed rectifier bridge 60 but any suitable source may be employed. The rectifier bridge is connected to a transformer 61 and terminals 62 which are to be connected to a source of alternating current power. Other electrical components such as the reticle lamp 15 and the reversible focussing motor 23 are connected to the same source of supply.

The protective photosensitive element 38 may be coupled to the electrical circuit in many ways, the parallel connection shown in FIGURE 5 being only one of the connections which may be used. In this circuit, the element 38 is a photoconductive cell, such as lead selenide, and is connected in parallel with winding 57 and its resistor 58. When this circuit is in its non-operating condition and the terminals 62 are not connected to a power source, no light can enter the focal plane because the reflecting surface 20 is held at a neutral non-transmitting position by springs 52 and 53 (FIG. 3).

When terminals 62 are connected to a source of power, direct current from the rectifier bridge 60 is applied to relay winding 57, and if the light intensity received through lens 37 (FIG. 4) is less than a predetermined value, the resistance of cell 38 will remain high enough so that the relay is operated and contacts 55 are closed. This action supplies potential to switch 54 and the operator can then direct light from either lens system to the focal plane of the camera. When switch 54 is closed to supply current to solenoid 50, gear sector 45 is turned in a counterclockwise direction and rotates reflector 20 to send light from the long focus lens system 12 to the focal plane. The short focus lens system 25 is activated in a similar manner.

If, at any time during the camera operation, the light intensity from the object becomes too great, the resistance of the photoconductive cell 38 drops and acts as a partial short circuit across relay winding 57. This normalizes the relay, contacts 55 are opened, and all current is removed from the solenoids 50, 51 thereby permitting springs 52 and 53 to restore reflector 20 to its neutral or non-transmitting position. As soon as the intense light is removed, the operation of the camera and lens system is returned to normal without any resetting operation.

From the above description it will be seen that there has been provided a tracking device having a protective system and a multiple lens system which will protect sensitive photo-elements within a television camera or other device in the focal plane. The protective system is always operational, even when the power is turned off and the device is not under control of an operator.

Having thus fully described the invention, what is claimed as new and desired to be secured by Letters Patent of the United States, is:

1. A tracking device for television cameras and the like comprising, a base, a plurality of lenses carried by the base, an angularly disposed rotatable mirror adjacent to the image end of said lenses, means to direct light entering the lenses toward the mirror, means to rotate the mirror from a non-transmitting position to one where light from one of the lenses is received and reflected to a focal plane, a photosensitive transducer for receiving light from the same source as said lenses, circuit means coupled to said transducer for returning the mirror to its non-transmitting position whenever the light intensity received by the transducer is above a predetermined value.

2. A tracking device for television cameras and the like comprising, a base, a plurality of lenses carried by the base, an angularly disposed rotatable mirror adjacent to the image end of said lenses, optical means for directing light from the said lenses toward the mirror for reflection toward a camera focal plane means for rotating the mirror from a non-transmitting position to a position where light from one of the lenses is selectively received and reflected to said focal plane, a photosensitive transducer for receiving light from the same source as said lenses, circuit means coupled to said transducer for disabling the mirror rotating means and for returning the mirror to its non-transmitting position whenever the light intensity received by the transducer is above a predetermined value.

3. A tracking device as claimed in claim 2 wherein said rotatable mirror is surrounded by a housing for preventing light from entering said focal plane when the mirror is in its non-transmitting position.

4. A tracking device as claimed in claim 2 wherein said transducer comprises a variable resistor whose resistance varies in response to the intensity of light received.

5. A tracking device as claimed in claim 2 wherein the lenses consist of a long focal length lens system and a short focal length lens system.

6. A tracking device as claimed in claim 2 wherein the means to direct the light into the mirror consists of a prism on the image end of each lens and a housing for the prism.

7. A tracking device as claimed in claim 2 wherein the means for rotating the mirror includes two solenoids, each coupled to a rotatable gear secured to the mirror mounting, the windings of said solenoids being coupled to said transducer.

References Cited by the Examiner

UNITED STATES PATENTS 2,421,476   6/1947   Belar _____ 178—7.92
2,481,083   4/1949   Chen _____ 178—7.92

DAVID G. REDINBAUGH, *Primary Examiner.*

J. McHUGH, *Assistant Examiner.*